(12) United States Patent  
Hayashi

(10) Patent No.: US 8,052,564 B2
(45) Date of Patent: Nov. 8, 2011

(54) DIFFERENTIAL GEAR UNIT

(75) Inventor: Kenichiro Hayashi, Nishikamo-gun (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 423 days.

(21) Appl. No.: 12/361,080

(22) Filed: Jan. 28, 2009

(65) Prior Publication Data

US 2009/0192008 A1    Jul. 30, 2009

(30) Foreign Application Priority Data

Jan. 29, 2008   (JP) .................................. 2008-017788

(51) Int. Cl.
*F16H 48/06*    (2006.01)
(52) U.S. Cl. ....................................... 475/230; 475/220
(58) Field of Classification Search .................. 180/233, 180/247, 248, 249, 250; 475/198, 199, 200, 475/201, 220
See application file for complete search history.

(56) References Cited

U.S. PATENT DOCUMENTS

| | | | | |
|---|---|---|---|---|
| 1,324,860 A | * | 12/1919 | Taylor | 475/233 |
| 3,131,578 A | * | 5/1964 | Elliott | 475/231 |
| 3,264,900 A | * | 8/1966 | Hartupee | 475/231 |
| 3,513,723 A | * | 5/1970 | Stees | 475/233 |
| 5,055,095 A | * | 10/1991 | Osenbaugh et al. | 475/233 |
| 5,183,446 A | * | 2/1993 | Hughes | 475/236 |
| 5,507,702 A | * | 4/1996 | Joachim et al. | 475/233 |
| 6,857,982 B2 | * | 2/2005 | Tomari et al. | 475/231 |

FOREIGN PATENT DOCUMENTS

| | | |
|---|---|---|
| JP | 09-287643 A | 11/1997 |
| JP | 2003-74667 A | 3/2003 |
| JP | 2005-16643 A | 1/2005 |
| JP | 2005-249212 A | 9/2005 |
| JP | 2006-349118 A | 12/2006 |
| JP | 2007-113747 A | 5/2007 |

\* cited by examiner

*Primary Examiner* — David D Le
*Assistant Examiner* — Michael Gonzalez
(74) *Attorney, Agent, or Firm* — Sughrue Mion, PLLC

(57) ABSTRACT

A differential gear unit has a pinion gear that can spin as well as revolve, a differential case that has a pinion retaining portion that supports the pinion gear, and a pair of side gears that mesh with the pinion gear. Frictional force generated at a portion where the pinion gear contacts the pinion retaining portion when the rotation speed of one side gear is faster than the rotation speed of the other side gear is different from the frictional force generated between the pinion gear and the pinion retaining portion when the rotation speed of the one side gear is slower than the rotation speed of the other side gear.

11 Claims, 11 Drawing Sheets

DIFFERENTIAL GEAR UNIT

INCORPORATION BY REFERENCE

The disclosure of Japanese Patent Application No. 2008-017788 filed on Jan. 29, 2008, including the specification, drawings, and abstract is incorporated herein by reference in its entirety.

BACKGROUND OF THE INVENTION

1. Field of the Invention

The invention relates to a differential gear unit, and more particularly, to a differential gear unit that uses a pinion gear.

2. Description of the Related Art

Japanese Patent Application Publication No. 2007-113747 (JP-A-2007-113747), for example, describes a related differential gear unit.

The differential gear unit described in JP-A-2007-113747 is a torque-sensitive differential gear unit in which pinion gears are retained by a differential case. However, with this differential gear unit there is the problem that differential-limiting force appropriate for the driving state of the vehicle is unable to be generated simply by limiting the differential based on torque.

SUMMARY OF THE INVENTION

This invention thus provides a differential gear unit capable of generating differential-limiting force appropriate for the driving state of the vehicle.

A first aspect of the invention relates to a differential gear unit that includes a pinion gear which is able to spin as well as revolve, and a case having a pinion retaining portion that retains the pinion gear. The pinion retaining portion is structured such that frictional force during acceleration which is generated between the pinion gear and the case during acceleration is different from the frictional force during deceleration which is generated between the pinion gear and the case during deceleration.

In the differential gear unit structured in this way, the frictional force between the pinion gear and the case during acceleration is different than it is during deceleration. Accordingly, differential-limiting force during one of acceleration or deceleration can be generated which is greater than the differential-limiting force generated during the other. As a result, differential-limiting force suitable for the driving state can be obtained.

The pinion retaining portion may be structured such that a contact area between the pinion retaining portion and the pinion gear during acceleration is different from the contact area between the pinion retaining portion and the pinion gear during deceleration.

The pinion retaining portion may have a non-cylindrical column shape.

The pinion retaining portion may have a radius that is different from the radius of the pinion gear.

The pinion retaining portion may have a straight portion and a curved portion.

A second aspect of the invention relates to a differential gear unit that includes a pinion gear which is able to spin as well as revolve, a pinion retaining portion that retains the pinion gear, and a first distribution gear and a second distribution gear which mesh with the pinion gear and distribute power. The pinion retaining portion is structured such that a first frictional force, which is generated between the pinion gear and the pinion retaining portion when the first distribution gear and the second distribution gear are in a first rotating state in which the rotation speed of the first distribution gear is faster than the rotation speed of the second distribution gear, is different from a second frictional force which is generated between the pinion gear and the pinion retaining portion when the first distribution gear and the second distribution gear are in a second rotating state in which the rotation speed of the first distribution gear is slower than the rotation speed of the second distribution gear.

In the differential gear unit structured in this way, differential-limiting force when the first distribution gear and the second distribution gear are in one of the first rotating state or the second rotating state is greater than the differential-limiting force when the first distribution gear and the second distribution gear are in the other rotating state.

The first distribution gear may be connected to a rear wheel and the second distribution gear may be connected to a front wheel. Also, when the first distribution gear and the second distribution gear are in the first rotating state, the rotation speed of the first distribution gear which is connected to a rear wheel may be faster than the rotation speed of the second distribution gear which is connected to a front wheel, and the first frictional force may be greater than the second frictional force.

In this case, when the rear wheel is slipping, even greater differential-limiting force can be obtained so torque can be transferred to the rear wheel side.

The pinion retaining portion may be structured such that a contact area between the pinion retaining portion and the pinion gear when the first distribution gear and the second distribution gear are in the first rotating state is different from the contact area between the pinion retaining portion and the pinion gear when the first distribution gear and the second distribution gear are in the second rotating state.

The pinion retaining portion may have a non-cylindrical column shape.

The pinion retaining portion may have a radius that is different from the radius of the pinion gear.

The pinion retaining portion may have a straight portion and a curved portion.

A third aspect of the invention relates to a differential gear unit that includes a pinion gear which is able to spin as well as revolve, and a case having a pinion retaining portion that retains the pinion gear. The pinion retaining portion has a non-cylindrical column shape, and frictional force generated during contact between the pinion gear and one region of the pinion retaining portion is different from the frictional force generated during contact between the pinion gear and another region of the pinion retaining portion.

The pinion retaining portion may have a radius that is different from the radius of the pinion gear.

The pinion retaining portion may have a straight portion and a curved portion.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF THE EMBODIMENTS

Figure 1:
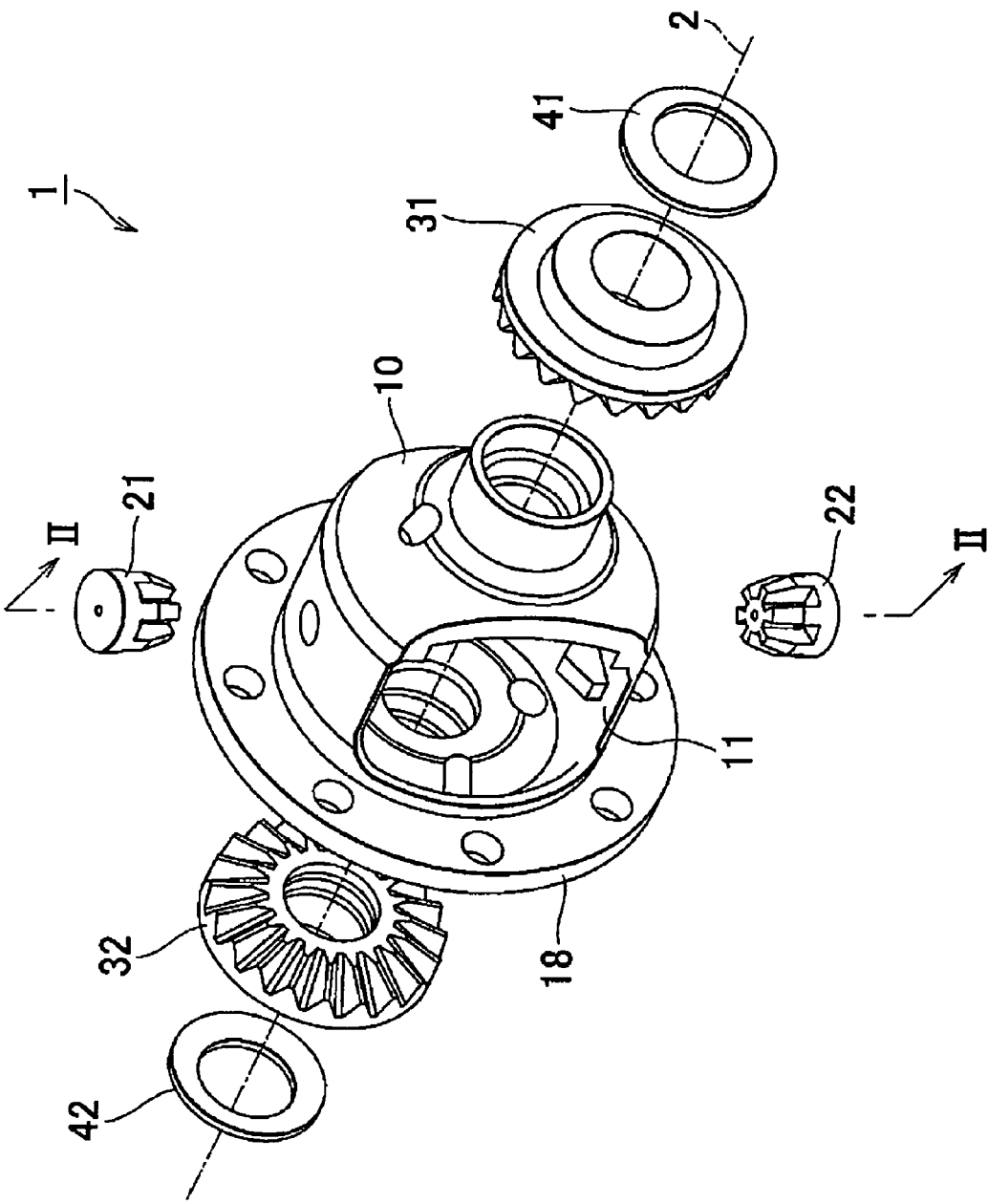
FIG. 1 is an exploded perspective view of a differential gear unit according to a first example embodiment of the invention.

Example embodiments of the present invention will be described in greater detail below with reference to the accompanying drawings. Incidentally, like or corresponding portions in the following example embodiments will be denoted by like reference characters and descriptions of those portions will not be repeated. The example embodiments may also be combined.

FIG. 1 is an exploded perspective view of a differential gear unit according to a first example embodiment of the invention. The differential gear unit 1 has a differential case 10, pinion gears 21 and 22 which are housed in the differential case 10, side gears 31 and 32 that are in mesh with the pinion gears 21 and 22 inside the differential case 10; and thrust washers which position the side gears 31 and 32 in the differential case 10. The differential case 10 has a cylindrical shape and houses power transmitting portions such as the pinion gears 21 and 22 and the side gears 31 and 32 and the like inside. The differential case 10 has a flange portion 18 to which a ring gear can be mounted. The flange portion 18 is connected to the ring gear and driving force is transmitted from the ring gear.

A window 11 is provided in the differential case 10. The pinion gears 21 and 22 and the side gears 31 and 32 are inserted into the space inside the differential case 10 through this window 11. In this example embodiment, power is transmitted using the two pinion gears 21 and 22. Alternatively, however, power may also be transmitted using more pinion gears, such as four pinion gears, for example.

Figure 2:
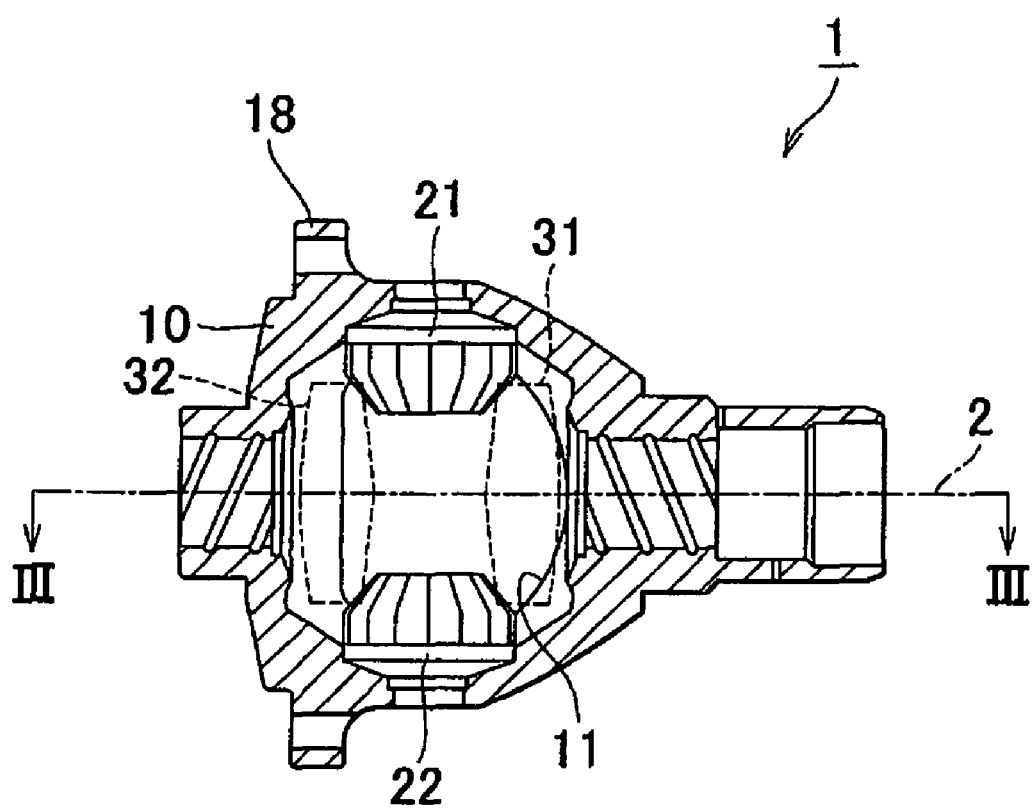
FIG. 2 is a sectional view taken along line II-II in FIG. 1.

FIG. 2 is a sectional view taken along line II-II in FIG. 1. The differential gear unit 1 has the differential case 10 that serves as a case, the pinion gears 21 and 22 which are housed in the differential case 10 and distribute power, and the side gears 31 and 32 which are in mesh with the pinion gears 21 and 22. The differential case 10 rotates about a rotational axis 2. The pinion gears 21 and 22 which are housed in the differential case 10 abut against the differential case 10 and thus frictionally slide. The side gears 31 and 32 which are housed in the differential case 10 are in mesh with the pinion gears 21 and 22 and distribute power. The pinion gear 21 can rotate (i.e., revolve) together with the differential case 10 as well as rotate (i.e., spin) about an axis that is perpendicular to the rotational axis 2. The side gears 31 and 32 are each connected to a driveshaft and transmit torque to their respective driveshafts.

Figure 3:
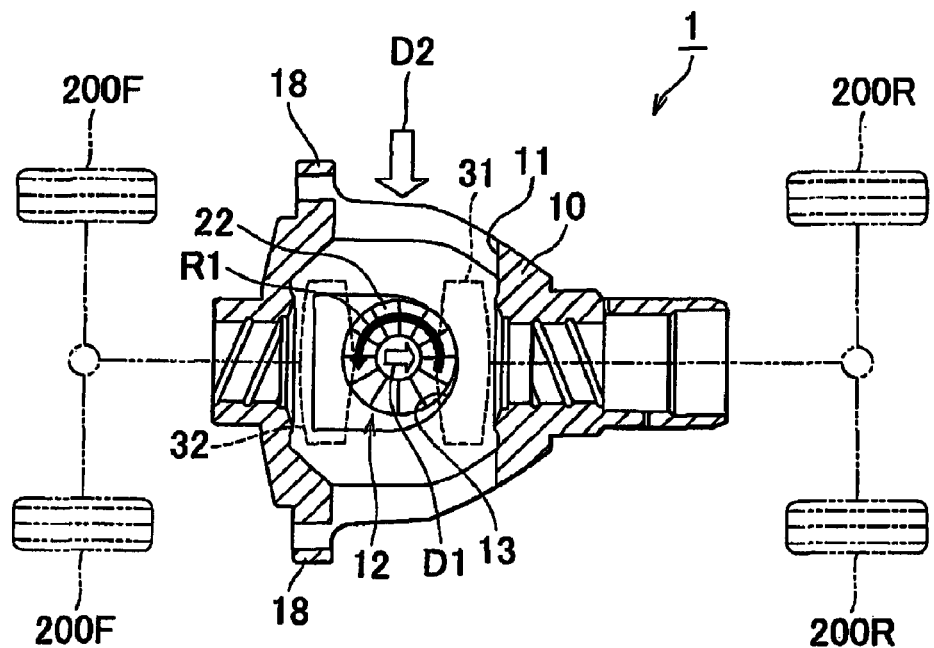
FIG. 3 is a sectional view taken along line III-III in FIG. 2.

FIG. 3 is a sectional view taken along line III-III in FIG. 2. A pinion retaining portion 12 is provided in the differential case 10. This pinion retaining unit 12 retains the pinion gear 22 in the differential case 10. The pinion gear 22 abuts against part of the pinion retaining portion 12 so frictional force is generated between the pinion gear 22 and the pinion retaining portion 12 when the pinion gear 22 spins. That is, the pinion gear 22 spins (i.e., autorotates) when there is a difference in rotation speed between the side gears 31 and 32. Because frictional force is generated at this time, force works to limit the differential between the side gears 31 and 32. In this specification, this force will be referred to as "differential-limiting force."

In this example, the differential gear unit 1 is used as a center differential case of a four-wheel-drive vehicle, with the side gear 31 being connected to rear wheels and the side gear 32 being connected to front wheels. In the state shown in FIG. 3, the rotation speed of the side gear 31 that is connected to the rear wheels 200R is faster than the rotation speed of the side gear 32 that is connected to the front wheels 200F. In this state, a load is applied from the differential case 10 to the pinion gear 22 in the direction indicated by the arrow D2 when the vehicle is traveling forward.

The rotation speed of the side gear 31 is faster than the rotation speed of the side gear 32 so the pinion gear 22 rotates in the direction indicated by the arrow R1. At this time, the pinion gear 22 frictionally slides contacting a curved region 13 of the pinion retaining portion 12 which serves as the abutting portion of the differential case 10. That is, the pinion gear 22 moves in the direction indicated by the arrow D1, which is where the curved region 13 is. The pinion gear 22 generates sliding resistance by sliding into this curved region 13. As a result, a large amount of frictional force is generated so the differential-limiting force increases.

Figure 4:
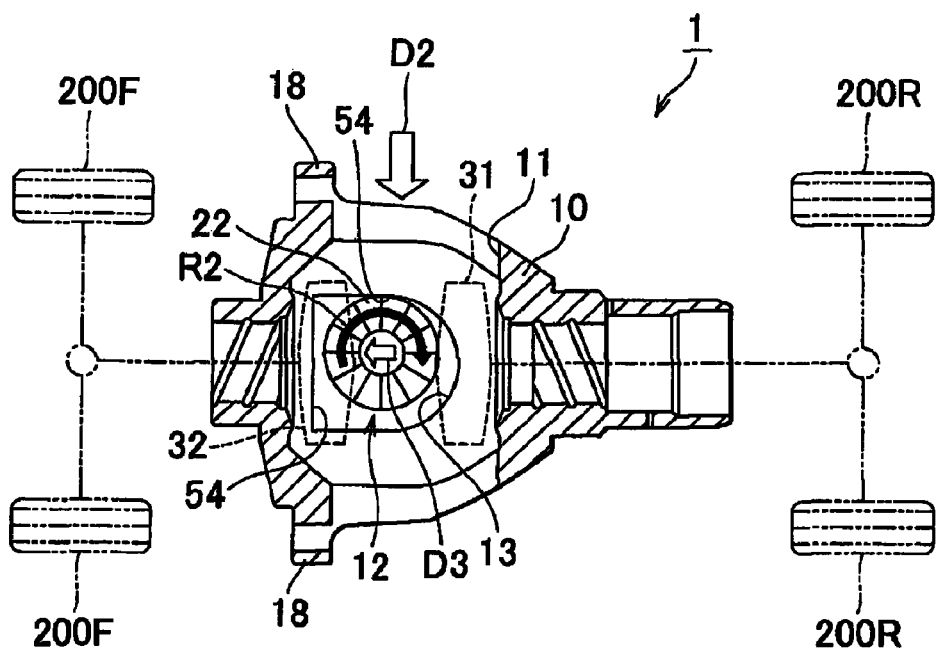
FIG. 4 is a sectional view of the differential gear unit of the first example embodiment in a different state.

FIG. 4 is a sectional view of the differential gear unit of the first example embodiment in another state. FIG. 4 illustrates a case in which the rotation speed of the side gear 31 which is connected to the rear wheels 200R is slower than the rotation speed of the side gear 32 which is connected to the front wheels 200F, i.e., a case in which the rotation speed of the front wheels is fast. More specifically, it is assumed that the vehicle is turning. In this case, a load in the direction indicated by the arrow D2 is applied from the differential case 10 to the pinion gear 22. The rotation speed of the side gear 32 becomes faster than the rotation speed of the side gear 31 so the pinion gear 22 rotates in the direction indicated by the arrow R2. As a result, the pinion gear 22 moves in the direction indicated by the arrow D3. At this time, the pinion gear 22 only contacts the differential case 10 slightly at a straight region 54 of the pinion retaining portion 12 so almost no sliding resistance is generated. As a result, the differential-limiting force decreases.

That is, the differential gear unit 1 according to the first example embodiment has the pinion gears 21 and 22 which can both spin and revolve, the differential case 10 that serves as a case that has the pinion retaining portion 12 that retains the pinion gears 21 and 22, and the side gear 31 which serves as a first distribution gear that distributes power by being in mesh with the pinion gears 21 and 22, and the side gear 32 which serves as a second distribution gear that also distributes power by being in mesh with the pinion gears 21 and 22, and the side gear 32. When the rotation speed of the first distribution gear is faster than the rotation speed of the second distribution gear (hereinafter this rotating state will simply be referred to as "first rotating state"), a certain amount of frictional force is generated between the pinion retaining portion 12 and the pinion gears 21 and 22. This frictional force will be referred to as "first frictional force." When the rotation speed of the first distribution gear is slower than the rotation speed of the second distribution gear (hereinafter this rotating state will simply be referred to as "second rotating state"), a different amount of frictional force is generated between the pinion retaining portion 12 and the pinion gears 21 and 22. This frictional force will be referred to as "second frictional force." The frictional force, and thus the differential-limiting force, is greater when the rotation speed of the front wheels 200F is slower than the rotation speed of the rear wheels 200R, compared to when the rotation speed of the front wheels 200F is faster than the rotation speed of the rear wheels 200R.

The pinion retaining portion 12 is structured such that the contact area between the pinion gear 22 and the pinion retaining portion 12 when the side gears 31 and 32 are in the first rotating state is different than the contact area between the pinion gear 22 and the pinion retaining portion 12 when the side gears 31 and 32 are in the second rotating state.

The pinion retaining portion 12 has a non-cylindrical column shape and the contact area between the pinion retaining portion 12 and the pinion gear 22 is different when the side gears 31 and 32 are in the first rotating state than it is when the side gears 31 and 32 are in the second rotating state.

The sectional surface that is perpendicular to the axial direction of the pinion retaining portion 12 has a radius that differs from the radius of the pinion gear 22, and the contact area between the pinion retaining portion 12 and the pinion gear 22 is different when the side gears 31 and 32 are in the first rotating state than it is when the side gears 31 and 32 are in the second rotating state. That is, because the sectional surface of the pinion retaining portion 12 has a radius that differs from that of the pinion gear 22, the pinion gear 22 is able to move within the pinion retaining portion 12 in the direction indicated by the arrow D1 or D3.

The outer periphery of the sectional surface that is perpendicular to the axial direction of the pinion retaining portion 12 has the straight region 54 and the curved region 13, and the contact area between the pinion retaining portion 12 and the pinion gear 22 is different when the side gears 31 and 32 are in the first rotating state than it is when the side gears 31 and 32 are in the second rotating state. That is, the contact area between the pinion retaining portion 12 and the pinion gear 22 at the curved region 13 is larger than the contact area between the pinion retaining portion 12 and the pinion gear 22 at the straight region 54. As a result, the frictional force during contact is greater when the contact area is large than it is when the contact area is small.

As the pinion gear 22 moves inside the pinion retaining portion 12, the region where it contacts the pinion retaining portion 12 changes, and the frictional force during contact between the pinion gear 22 and the pinion retaining portion 12 is different in each region. In the differential gear unit structured in this way, the differential-limiting force is increased to increase driving force to the front wheels when the rotation speed of the wheels 200R is fast, such as when the rear wheels 200R are slipping, for example. In contrast, the differential-limiting force is reduced to facilitate rotation when the vehicle is turning in such a manner that the rotation speed of the front wheels 200F is fast.

In this example embodiment, the outer periphery of the sectional surface of the pinion retaining portion 12 which is perpendicular to the axial direction of the pinion retaining portion 12 has a column shape that is formed by two corners and an arc that extends outward from the axial center. However, the shape of the sectional surface is not limited to having two corners. That is, the sectional surface may be formed by an arc and at least one corner.

Figure 5:
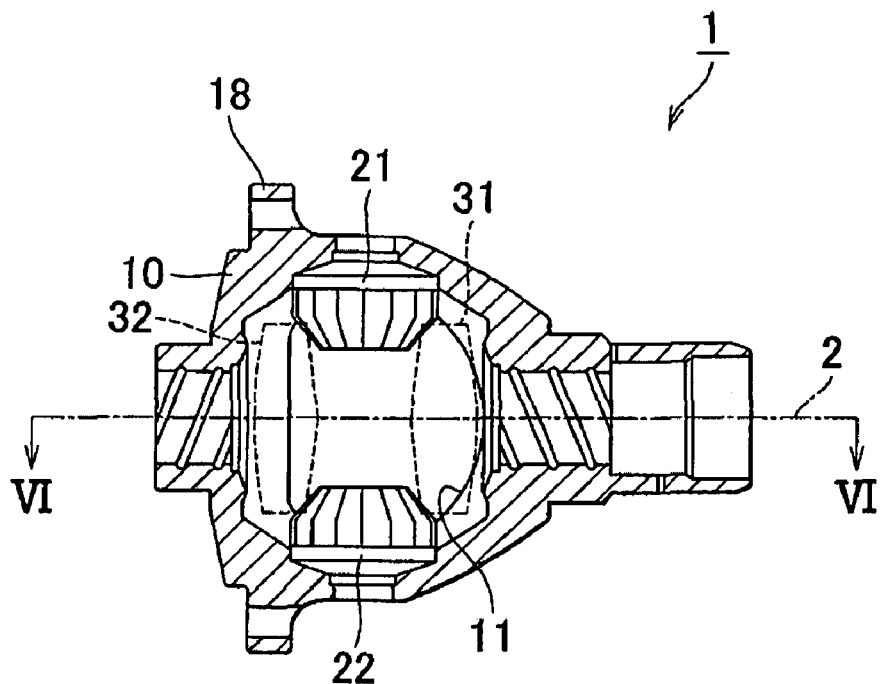
FIG. 5 is a sectional view of a differential gear unit according to a second example embodiment of the invention.
Figure 6:
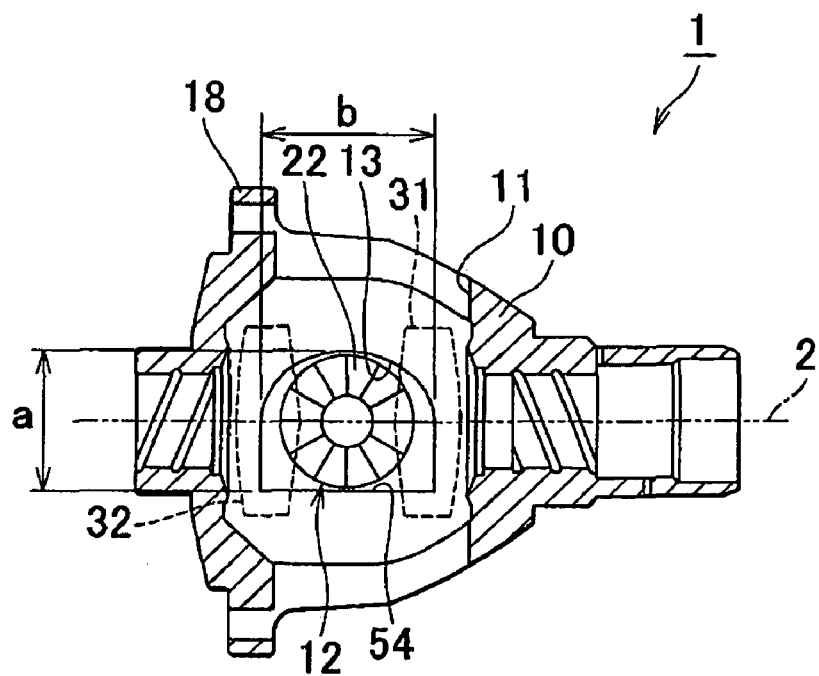
FIG. 6 is a sectional view taken along line VI-VI in FIG. 5.

FIG. 5 is a sectional view of a differential gear unit according to a second example embodiment of the invention, and FIG. 6 is a sectional view taken along line VI-VI in FIG. 5. The differential gear unit 1 according to this second example embodiment differs from the differential gear unit 1 according to the first example embodiment in that the pinion retaining portion 12 is symmetrical with respect to a line that is perpendicular to the rotational axis 2 and passes through the center of the pinion gear 22. The length a of the pinion retaining portion 12 is substantially the same as the diameter of the pinion gear 22 and the width b of the pinion retaining portion 12 is greater than the diameter of the pinion gear 22.

Figure 7:
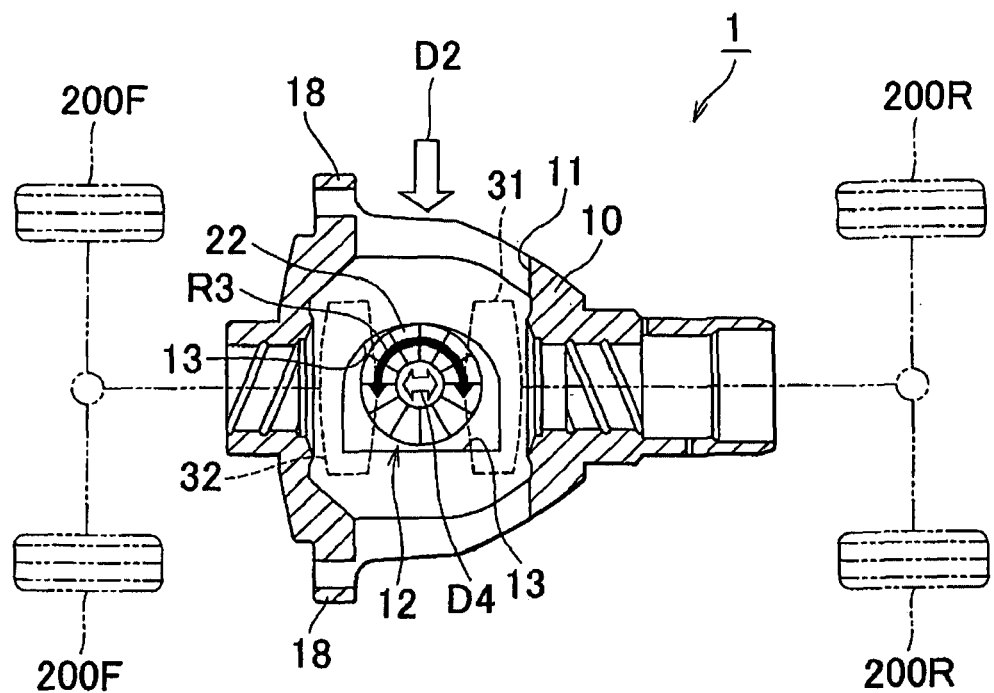
FIG. 7 is a sectional view of the internal structure of the differential gear unit during forward acceleration.

FIG. 7 is a sectional view of the internal structure of the differential gear unit when the vehicle is accelerating while traveling forward (i.e., during forward acceleration). During forward acceleration, the pinion gear 22 receives a load in the direction indicated by the arrow D2 from the differential case 10. This causes the pinion gear 22 to contact the curved region 13 of the pinion retaining portion 12 and rotate in one of the directions indicated by the arrows R3. That is, during forward acceleration, the rotation speed of one side gear 31 or 32 is faster than the rotation speed of the other side gear 31 or 32 so the pinion gear 22 can rotate in both directions as shown by the arrows R3. Also, the pinion gear 22 can also move in both of the directions shown by the arrow D4. Regardless of the direction in which it moves, the pinion gear 22 contacts the curved region 13 of the pinion retaining portion 12 and generates sliding resistance as it slides into this curved region 13.

Figure 8:
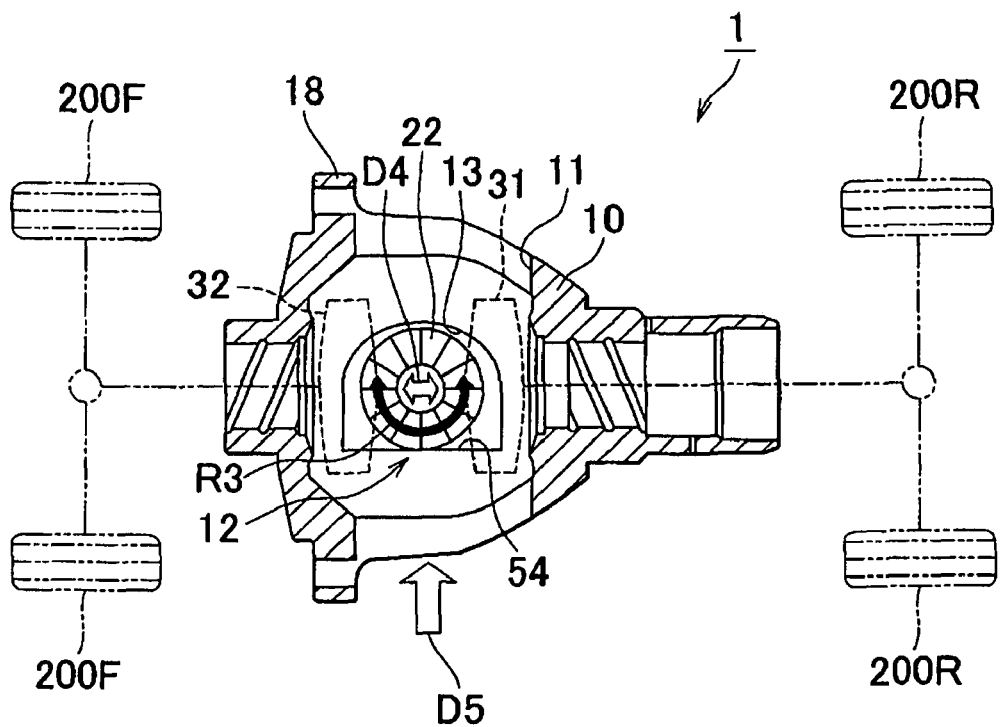
FIG. 8 is a sectional view of the internal structure of the differential gear unit during forward deceleration.

FIG. 8 is a sectional view of the internal structure of the differential gear unit when the vehicle is decelerating while traveling forward (i.e., during forward deceleration). When decelerating, force in the direction indicated by the arrow D5 is transmitted from the differential case 10 to the pinion gear 22. Accordingly, the pinion gear 22 only contacts the straight region 54, which is part of the pinion retaining portion 12 inside the differential case 10, so almost no sliding resistance is generated. As a result, the pinion gear 22 is not able to be inhibited from spinning so the differential-limiting force decreases.

That is, the downshift instruction according to the second example embodiment has the pinion gears 21 and 22 which can both spin and revolve, and the differential case 10 which serves as a case that has the pinion retaining portion 12 that retains the pinion gears 21 and 22. The frictional force between the pinion gears and the case during acceleration is different than the frictional force between the pinion gears and the case during deceleration.

The frictional force during contact between the pinion gears 22 and the pinion retaining portion 12 is also different depending on the region of that contact. The differential gear unit structured in this way enables the differential-limiting force during forward acceleration to be made to differ from the differential-limiting force during forward deceleration, as shown in FIGS. 7 and 8, by forming the sectional shape of the pinion retaining portion 12 provided with the curved region 13 and the straight portion 54 according to the desired frictional force to be generated. As a result, the differential can be precisely limited according to the driving state.

That is, the differential-limiting force can be generated appropriately during acceleration, during deceleration, and during coasting.

Figure 9:
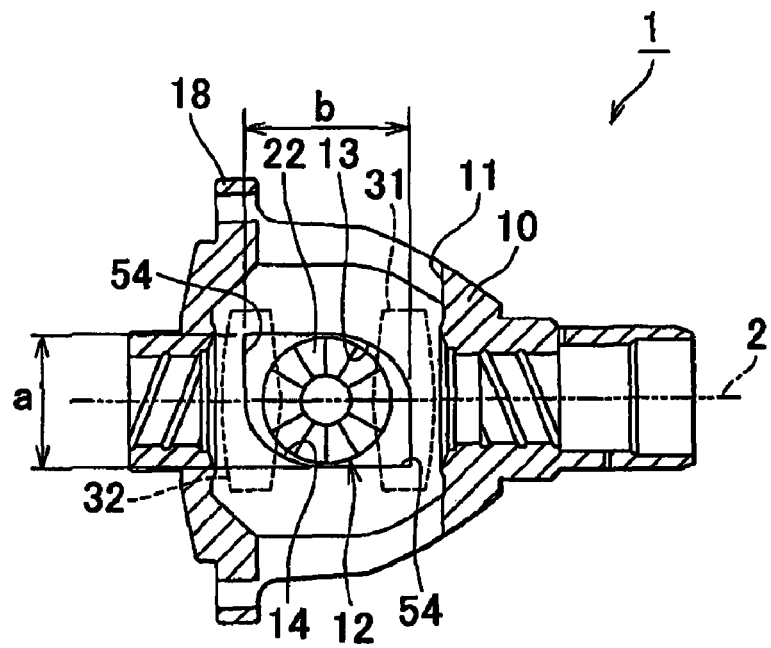
FIG. 9 is a sectional view of a differential gear unit according to a third example embodiment of the invention.

FIG. 9 is a sectional view of a differential gear unit according to a third example embodiment of the invention. The differential gear unit 1 according to this third example embodiment of the invention differs from the differential gear units 1 according to the first and second example embodiments in that the shape of the sectional surface perpendicular to the axial direction of the pinion retaining portion 12 is different. That is, curved regions 13 and 14 are formed in positions so that they face one another centered on the pinion gear 22, and all other portions are straight. That is, the pinion retaining portion 12 has two curved portions that face one another, and two square corner portions that face one another. In this case, the dimension a is substantially the same as the diameter of the pinion gear 22, and the dimension b is larger than the diameter of the pinion gear 22.

Figure 10:
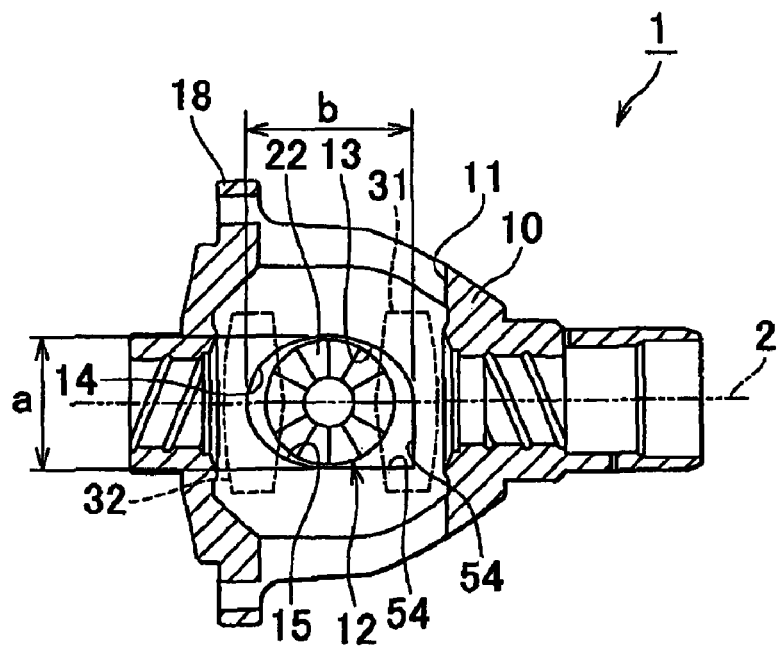
FIG. 10 is a sectional view of a differential gear unit according to a modified example of the third example embodiment.

FIG. 10 is a sectional view of a differential gear unit according to a modified example of the third example embodiment. The sectional surface that is perpendicular to the axial direction of the pinion retaining portion 12 has one corner portion that is between straight regions 54, and curved regions 13, 14, and 15 which constitute all other portions. In this case, the dimension a is substantially the same as the diameter of the pinion gear 22, and the dimension b is larger than the diameter of the pinion gear 22.

Figure 11:
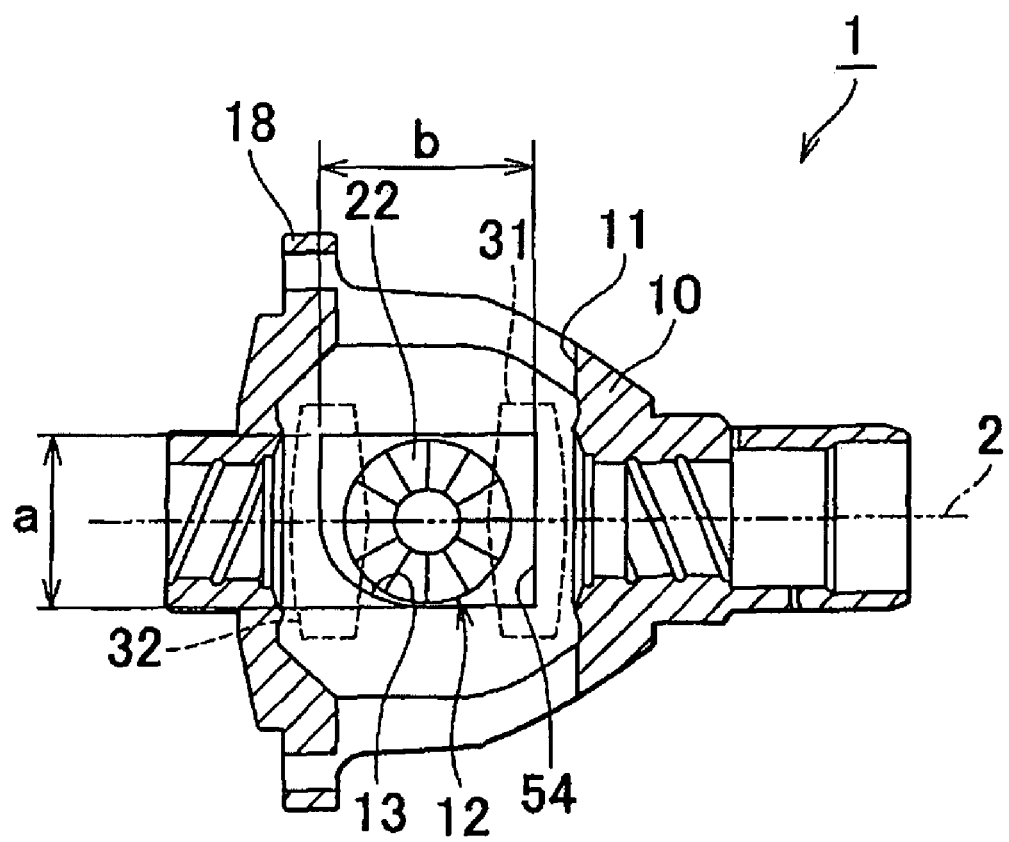
FIG. 11 is a sectional view of a differential gear unit according to another modified example of the third example embodiment.

FIG. 11 is a sectional view of a differential gear unit according to another modified example of the third example embodiment. Referring to FIG. 11, the sectional surface perpendicular to the axial direction of the pinion retaining portion 12 has three corner portions formed by the straight regions 54, and one curved region 13. In this case, the dimension a is substantially the same as the diameter of the pinion gear 22, and the dimension b is larger than the diameter of the pinion gear 22.

The differential gear unit according to the third example embodiment structured in this way yields the same effects as those yielded by the differential gear unit 1 according to the second example embodiment.

In the differential gear units according to the second and third example embodiments, the pinion retaining portion 12 is structured such that the contact area between the pinion gears 22 and the pinion retaining portion 12 during acceleration differs from the contact area between the pinion gears 22 and the pinion retaining portion 12 during deceleration.

More specifically, the pinion retaining portion 12 has a non-cylindrical column shape, and the contact area between the pinion retaining portion 12 and the pinion gear 22 is different during acceleration that it is during deceleration.

The pinion retaining portion 12 has a radius that differs from the radius of the pinion gear 22, and the contact area between the pinion retaining portion 12 and the pinion gear 22 is different during acceleration that it is during deceleration.

The pinion retaining portion 12 has the straight region 54 and the curved region 13, and the contact area between the pinion retaining portion 12 and the pinion gear 22 is different during acceleration that it is during deceleration.

The frictional force during contact between the pinion gear 22 and the pinion retaining portion 12 is different at the different regions of the pinion retaining portion 12.

Figure 12:
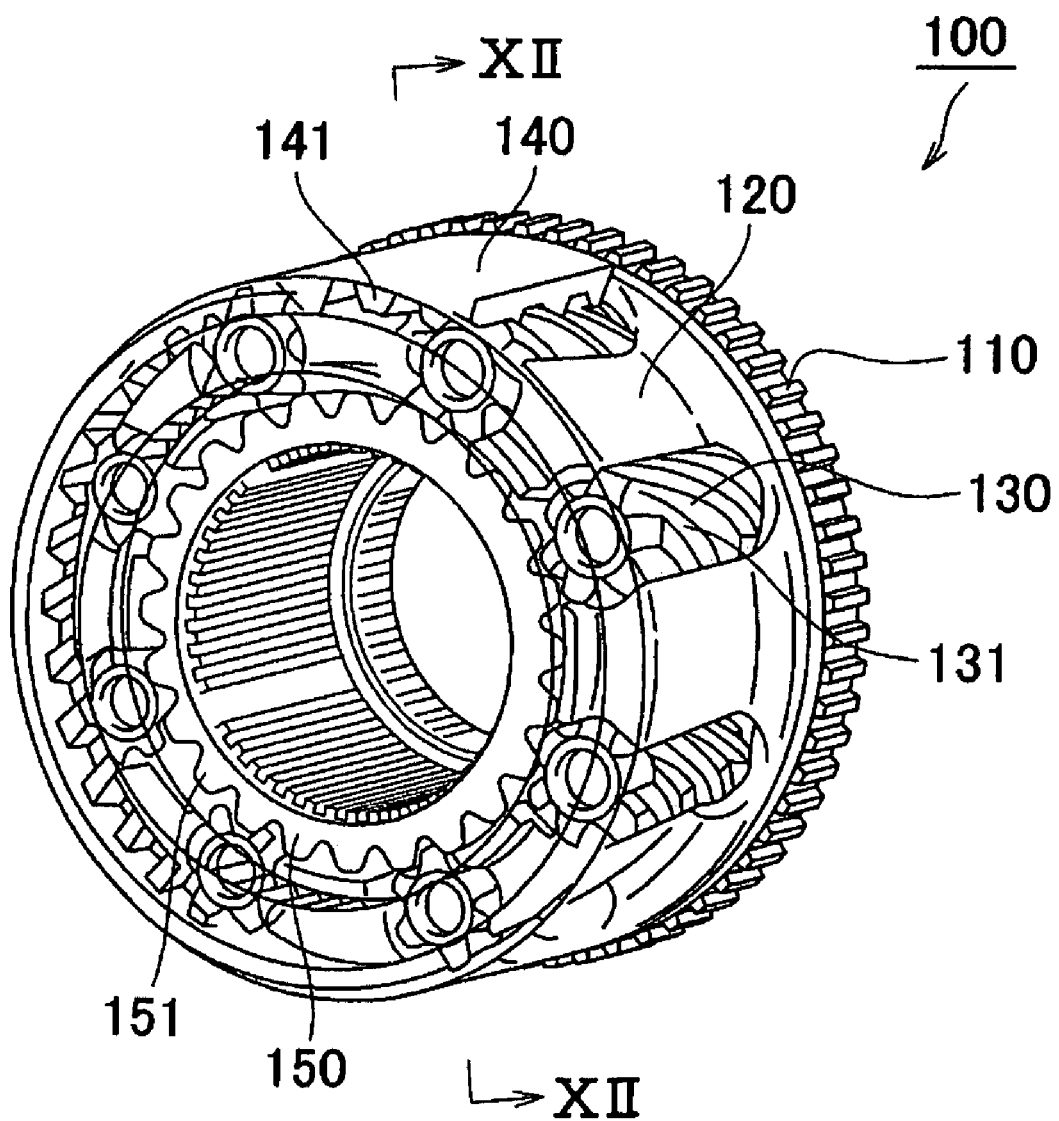
FIG. 12 is a perspective view of a differential gear unit according to a fourth example embodiment of the invention.
Figure 13:
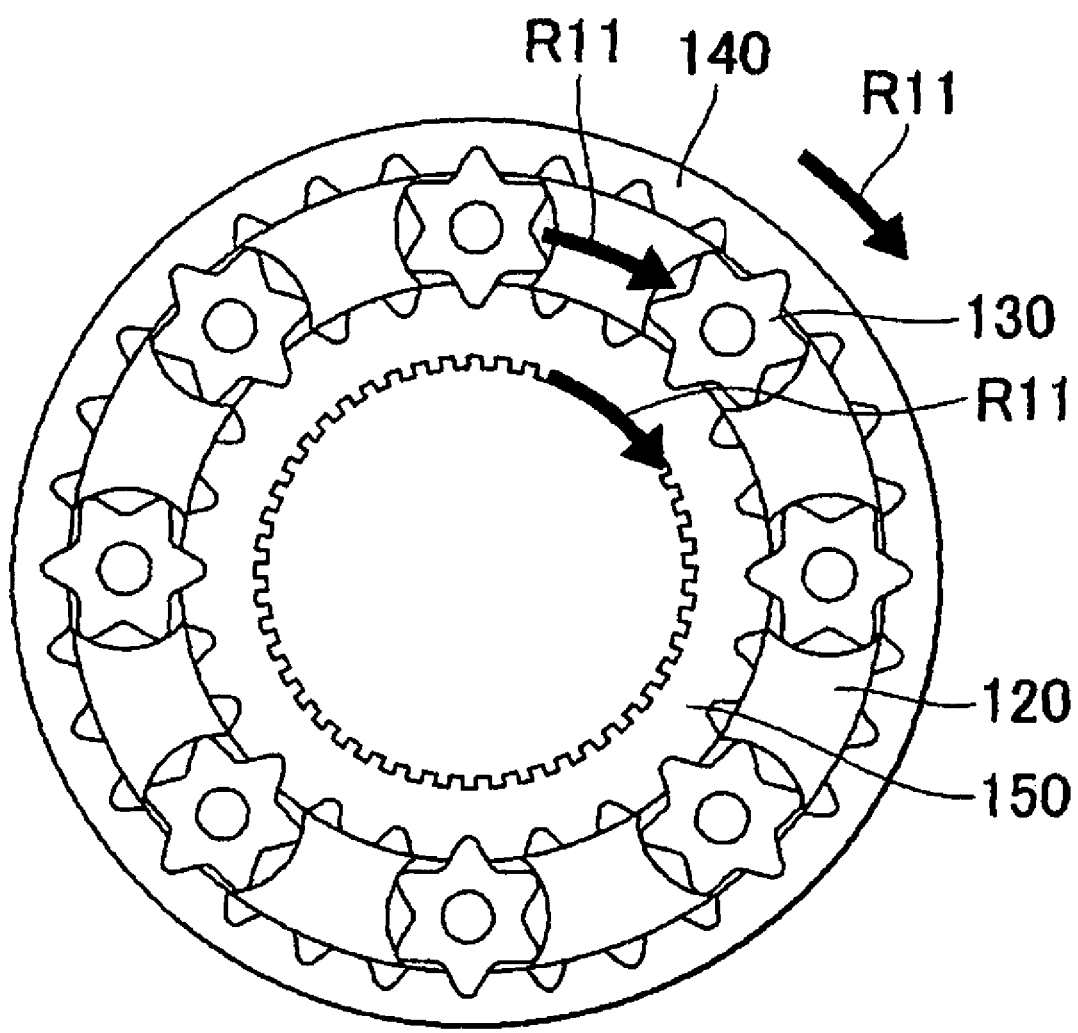
FIG. 13 is a sectional view taken along line XII-XII in FIG. 12.

FIG. 12 is a perspective view of a differential gear unit according to a fourth example embodiment of the invention, and FIG. 13 is a sectional view taken along line XII-XII in FIG. 12. As shown in FIGS. 12 and 13, the differential gear unit 1 has a differential case 110, a planetary carrier 120 which is in mesh with the differential case 110 and rotates together with the differential case 110, pinion gears 130 that are retained on the planetary carrier 120, and a sun gear 150 and a ring gear 140, both of which are in mesh with the pinion gears 130.

The differential case 110 has a cylindrical shape and the planetary carrier 120 fits inside of the differential case 110. The planetary carrier 120 retains the plurality of pinion gears 130. Helical teeth 131 are formed on the surfaces of the pinion gears 130, and the ring gear 140 is arranged to the outside of the path on which the pinion gears 130 are arranged. The sun gear 150 is arranged to the inside of the path on which the plurality of pinion gears 130 are arranged. Helical teeth 141 are formed on the surface of the ring gear 140 and helical teeth 151 are formed on the surface of the sun gear 150. These helical teeth 141 and 151 mesh with the helical teeth 131 on the pinion gears 130. The pinion gears 130 are retained on the planetary carrier 120, and a clutch plate is provided at both ends of the pinion gears 130. Thrust is generated by the helical teeth 131 on the pinion gears 130 meshing with the other helical teeth 141 and 151. This thrust is received by the clutch plates. When the pinion gears 130 spin (autorotate) in a given direction, the clutch plates receive thrust force in the direction that pushes on the planetary carrier 120 from the sun gear 150. As a result, the differential is limited such that the rotation between the planetary carrier 120 and the sun gear 150 decreases.

Figure 14:
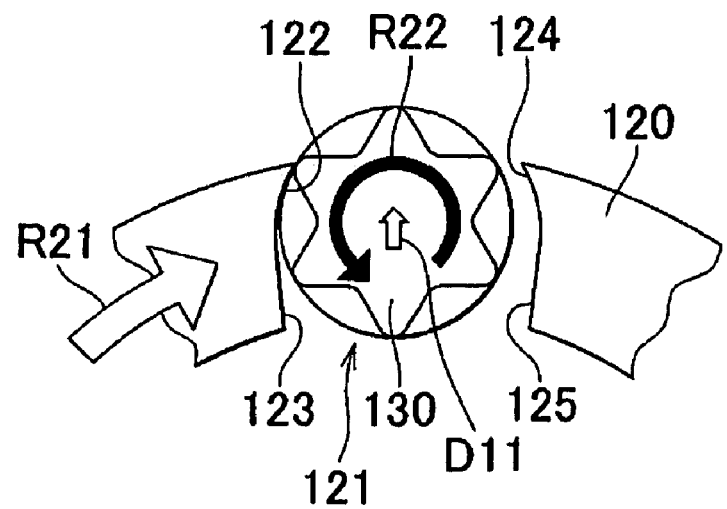
FIG. 14 is a detailed view of a planetary carrier and a pinion gear.

FIGS. 14 to 17 are detailed views of the planetary carrier and the pinion gear. Referring to FIG. 14, four corners 122, 123, 124, and 125 of portions of the planetary carrier 120 that face the pinion gears 130 are either curved or straight. More specifically, the corners 122 and 124 are curved and the corners 123 and 125 are straight. In other words, the contact surfaces of the portions of the planetary carrier 120 that retain the pinion gears 130 which contact the pinion gears 130 are formed by flat surfaces and curved surfaces. In this example embodiment, the contact surfaces that are positioned on the outer peripheral side of the differential gear unit 100 and which include the two corners 122 and 124 are formed by curved surfaces, and the contact surfaces that are positioned on the inner peripheral side of the differential gear unit 100 and which include the corners 123 and 125 are formed by flat surfaces. Incidentally, the curved surfaces are curved along the outer peripheries of the pinion gears 130. The sun gear 150 is connected to the front wheel side and the ring gear 140 is connected to the rear wheel side. When the rotation speed of the front wheels is faster than the rotation speed of the rear wheels during forward acceleration or reverse deceleration, the pinion gears 130 rotate to the left as indicated by the arrow R22 in FIG. 14.

Also, a load is applied from the planetary carrier 120 to the pinion gears 130 in the direction indicated by the arrow R21. As a result, the curved corners 122 come into contact with the pinion gears 130, such that the pinion gears 130 tries to move in the direction indicated by the arrow D11. At this time, the contact area between the pinion gears 130 and the planetary carrier 120 increases, thereby limiting the autorotation (i.e., spinning) of the pinion gears 130. As a result, the differential-limiting force increases.

Figure 15:
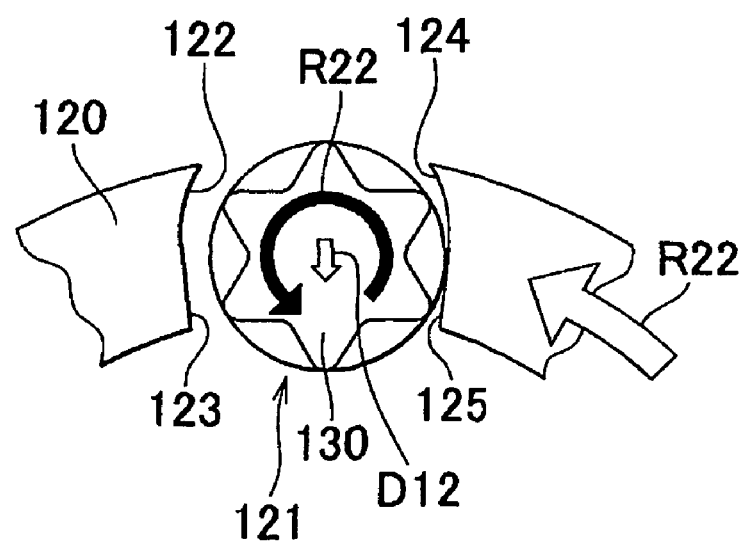
FIG. 15 is another detailed view of the planetary carrier and the pinion gear.

FIG. 15 shows a case in which the rotation speed of the front wheels is faster than the rotation speed of the rear wheels during forward deceleration or reverse acceleration. In this case, a load is applied in the direction indicated by the arrow R20 from the planetary carrier 120 to the pinion gears 130. Also, as a result, the pinion gears 130 contact the flat portions of the corners 125 and move in the direction indicated by the arrow D12. At this time, the contact area between the pinion gears 130 and the planetary carrier 120 decreases so the force that inhibits the pinion gears 130 from spinning decreases. As a result, the differential-limiting force decreases.

Figure 16:
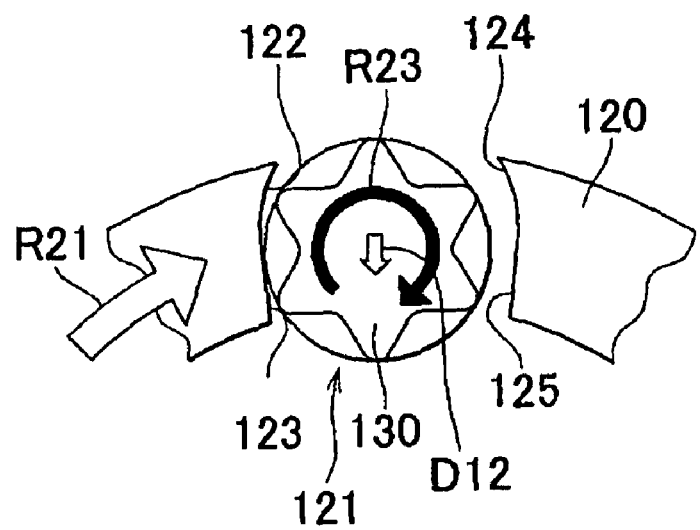
FIG. 16 is yet another detailed view of the planetary carrier and the pinion gear.

FIG. 16 shows a case in which the rotation speed of the rear wheels is faster than the rotation speed of the front wheels during forward acceleration or reverse deceleration. When the rotation speed of the rear wheels is faster than the rotation speed of the front wheels, the pinion gears 130 spin in the direction indicated by the arrow R23. Also, force is applied in the direction indicated by the arrow R21 from the planetary carrier 120 to the pinion gears 130. As a result, the pinion gears 130 move in the direction indicated by the arrow D12 so as to contact the flat portion of the corner 123. As a result, the frictional force generated from contact between the pinion gears 130 and the planetary carrier 120 decreases, so there is little effect from inhibiting autorotation (i.e., spinning) of the pinion gears 130. As a result, the differential-limiting force decreases.

Figure 17:
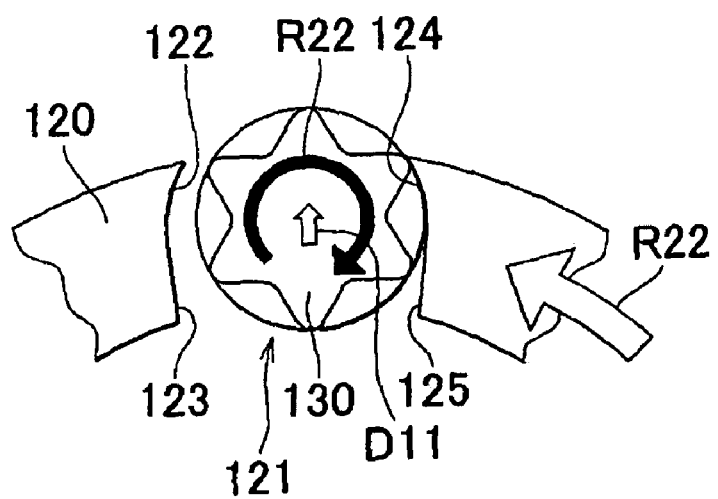
FIG. 17 is still another detailed view of the planetary carrier and the pinion gear.

Referring to FIG. 17, when the rotation speed of the rear wheels is faster than the rotation speed of the front wheels during forward deceleration or reverse acceleration, force is applied in the direction indicated by the arrow R20 from the planetary carrier 120. At this time, the pinion gears 130 move in the direction indicated by the arrow D11. The curved corners 124 contact the pinion gears 130 so the contact area increases. As a result, the force inhibiting the pinion gears 130 from spinning increases. Hence, the differential-limiting force increases.

In this example embodiment, two of the four corners of the contact surface of the planetary carrier 120 that contacts the pinion gears 130 are curved and the other two corners are straight. However, the invention is not limited to this. That is, as long as one of the corners, from among the four corners 122, 123, 124, and 125, is curved, the frictional force at that portion increases, thus enabling the differential-limiting force to be increased.

The differential gear unit according to the fourth example embodiment structured in this way also yields the same effects as those yielded by the differential gear units according to the first and second example embodiments.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A differential gear unit comprising:
   a pinion gear which is able to spin as well as revolve; and
   a case having a pinion retaining portion that retains the pinion gear,
   wherein the pinion gear abuts against part of the pinion retaining portion so that frictional force is generated between the pinion gear and the pinion retaining portion when the pinion gear spins, and the frictional force which is generated between the pinion gear and the case during acceleration is different from the frictional force which is generated between the pinion gear and the case during deceleration,
   wherein a contact area between the pinion retaining portion and the pinion gear during acceleration is different from a contact area between the pinion retaining portion and the pinion gear during deceleration.

2. The differential gear unit according to claim 1, wherein the pinion retaining portion has a non-cylindrical column shape.

3. The differential gear unit according to claim 1, wherein the pinion retaining portion has a radius that is different from the radius of the pinion gear.

4. The differential gear unit according to claim 1, wherein the pinion retaining portion has a straight portion and a curved portion.

5. The differential gear unit according to claim 1, wherein the contact area between the pinion gear and the pinion retaining portion during acceleration is greater than the contact area between the pinion gear and the pinion retaining portion during deceleration.

6. The differential gear unit according to claim 4, wherein the pinion gear contacts the curved portion of the pinion retaining portion during acceleration, and the pinion gear contacts the straight portion of the pinion retaining portion during deceleration.

7. A differential gear unit comprising:
   a pinion gear which is able to spin as well as revolve;
   a pinion retaining portion that retains the pinion gear; and
   a first distribution gear and a second distribution gear which mesh with the pinion gear and distribute power,
   wherein the pinion gear abuts against part of the pinion retaining portion so that frictional force is generated between the pinion gear and the pinion retaining portion when the pinion gear spins, and a first frictional force, which is generated between the pinion gear and the pinion retaining portion when the first distribution gear and the second distribution gear are in a first rotating state in which the rotation speed of the first distribution gear is faster than the rotation speed of the second distribution gear, is different from a second frictional force which is generated between the pinion gear and the pinion retaining portion when the first distribution gear and the second distribution gear are in a second rotating state in which the rotation speed of the first distribution gear is slower than the rotation speed of the second distribution gear,
   wherein a contact area between the pinion retaining portion and the pinion gear when the first distribution gear and the second distribution gear are in the first rotating state is different from a contact area between the pinion retaining portion and the pinion gear when the first distribution gear and the second distribution gear are in the second rotating state.

8. The differential gear unit according to claim 7, wherein the first distribution gear is connected to a rear wheel and the second distribution gear is connected to a front wheel, and when the first distribution gear and the second distribution gear are in the first rotating state, the rotation speed of the first distribution gear which is connected to a rear wheel is faster than the rotation speed of the second distribution gear which is connected to a front wheel, and the first frictional force is greater than the second frictional force.

9. The differential gear unit according to claim 7, wherein the pinion retaining portion has a non-cylindrical column shape.

10. The differential gear unit according to claim 7, wherein the pinion retaining portion has a radius that is different from the radius of the pinion gear.

11. The differential gear unit according to claim 7, wherein the pinion retaining portion has a straight portion and a curved portion.

* * * * *